United States Patent
Kurayama

(10) Patent No.: US 9,318,902 B2
(45) Date of Patent: Apr. 19, 2016

(54) POWER SUPPLY DEVICE

(71) Applicant: Kyushu Electric Power Co., Inc., Fukuoka (JP)

(72) Inventor: Kouji Kurayama, Fukuoka (JP)

(73) Assignee: Kyushu Electric Power Co., Inc., Chuo-ku, Fukuoka-shi, Fukuoka (JP)

( * ) Notice: Subject to any disclaimer, the term of this patent is extended or adjusted under 35 U.S.C. 154(b) by 510 days.

(21) Appl. No.: 13/780,943

(22) Filed: Feb. 28, 2013

(65) Prior Publication Data

US 2013/0241496 A1 Sep. 19, 2013

Related U.S. Application Data

(63) Continuation of application No. PCT/JP2011/079521, filed on Dec. 20, 2011.

(30) Foreign Application Priority Data

Dec. 22, 2010 (JP) ................................. 2010-286074

(51) Int. Cl.
*H01H 35/00* (2006.01)
*H01H 83/00* (2006.01)
*H02J 7/00* (2006.01)

(52) U.S. Cl.
CPC ............. *H02J 7/0031* (2013.01); *H02J 7/0068* (2013.01)

(58) Field of Classification Search
CPC ........................... H02J 77/0031; H02J 7/0068
USPC ......................................................... 307/116
See application file for complete search history.

(56) References Cited

U.S. PATENT DOCUMENTS

| 5,398,149 A * | 3/1995 | Weil ............................... 361/50 |
| 2002/0079869 A1* | 6/2002 | Fujiwara ....................... 320/157 |
| 2003/0030954 A1* | 2/2003 | Bax et al. ........................ 361/87 |
| 2006/0071618 A1 | 4/2006 | Yudahira et al. |
| 2008/0185999 A1 | 8/2008 | Matsukawa et al. |

(Continued)

FOREIGN PATENT DOCUMENTS

| JP | 06-237521 A | 8/1994 |
| JP | 08-182115 A | 7/1996 |

(Continued)

OTHER PUBLICATIONS

Office Action; Japanese Patent Office; Japan; May 22, 2013.

(Continued)

*Primary Examiner* — Thienvu Tran
*Assistant Examiner* — Toan Vu
(74) *Attorney, Agent, or Firm* — Duquette Law Group, LLC

(57) ABSTRACT

Provided is a power supply device which uses a simplified device configuration to reliably detect anomalies such as fused contacts, and which eliminates overcharging and secondary battery hazards caused by overcharging. The power supply device (1) is provided with: a control unit (7) for monitoring and controlling the operation of the power supply device (1), and for monitoring anomalies in the power supply device (1); a secondary battery (3) connected to the control unit (7), and for discharging electricity which has been charged; a main contact (9) connected to a battery circuit network (8) formed between the secondary battery (3) and a load (13); an auxiliary contact (10) connected in series to the main contact (9), and which is always on; and an anomaly detection circuit (11a).

9 Claims, 9 Drawing Sheets

(56) References Cited

U.S. PATENT DOCUMENTS

| | | | |
|---|---|---|---|
| 2009/0189451 A1* | 7/2009 | Roepke | 307/66 |
| 2009/0212627 A1* | 8/2009 | Sakata et al. | 307/10.7 |
| 2011/0175571 A1* | 7/2011 | Renken et al. | 320/112 |

FOREIGN PATENT DOCUMENTS

| | | |
|---|---|---|
| JP | 2002-320390 A | 10/2002 |
| JP | 2004-297866 A | 10/2004 |
| JP | 2005-094974 A | 4/2005 |
| JP | 2006129691 A | 5/2006 |
| JP | 2010161009 A | 7/2010 |
| JP | 2010193558 A | 9/2010 |
| WO | 2007/116530 A1 | 10/2007 |

OTHER PUBLICATIONS

The Extended European Search Report dated Apr. 4, 2014 from corresponding International Application No. PCT/JP2011079521.

\* cited by examiner

POWER SUPPLY DEVICE

RELATED APPLICATIONS

This patent application is a continuation of International Application No. PCT/JP2011/079521, filed on Dec. 20, 2011, entitled, "Power Supply Device," which claims priority to Japanese Patent Application No. 2010-286074, filed on Dec. 22, 2010, the contents and teachings of each of which are hereby incorporated by reference in their entirety.

FIELD

The present innovation relates to a power supply apparatus utilizing a secondary battery.

BACKGROUND $CO_2$, NOx, black exhaust, harmful particulate material, etc. contained in an exhaust gas discharged from an engine generator, which is used for example in a civil engineering work, an electric work, a building work, or the like may invite an environmental pollution. In addition, the noise from the engine may also cause disturbance in sleep in the middle of night, thus exerting an influence on a life environment. Accordingly, there has been expected a practical realization of a power supply apparatus utilizing a secondary battery without an exhaust gas and noise (a battery-powered generator). A lithium ion secondary battery may be taken as an example of a future technology having a high degree of expectation.

FIG. 9 shows a general circuit diagram of a power supply apparatus utilizing such a secondary battery. According to the power supply apparatus of FIG. 9, pushing a start switch causes a control unit to close a main contact, and an inverter is activated, thus permitting to discharge an electric current to a load. Alternatively, pushing a stop switch causes the control unit to open the main contact to quit the power supply apparatus. During a non-operational period of time of the power supply apparatus, the electric current as charged in the secondary battery is consumed as a standby electricity. The apparatus is connected to a charge unit during a charging step constitutes a closed circuit between the apparatus and the charge unit to perform a charge. When the charging step is carried out so as to exceed a predetermined amount of charge, the control unit quits the charge from the charge unit based on information on the secondary battery, as acquired from the secondary battery.

The secondary battery (for example, a lithium battery, a nickel hydride battery, etc.) has a remarkably large amount of energy, and any abnormal situation may lead to increase in an internal pressure, thus inviting a problem of blowing out a high-temperature gas. Therefore, there has been a strong demand for a technique to exclude such a risk. Particularly, the lithium battery has a low tolerance for overcharge and over-discharge, and has a low overcharge tolerance of about 150% to about 200%, while a lead battery generally has an overcharge tolerance of about 500%. In addition, an occurrence of overcharge may cause the melting of an electrode material due to an internal short-circuit of the battery, thus being at risk for the blowing out of the contents. Further, the over-discharge in which the voltage is equal to or less than a predetermined minimum voltage may causes the battery itself to produce heat, leading to a hazardous situation in the same manner.

The main contact for opening or closing the direct current electricity of the secondary battery as shown in FIG. 9 may cause a contact fusion due to use for a long period of time, with the result that the discharge continues although the control unit makes a control of opening the main contact, leading to the over-discharge. In general, an alternating current circuit has a periodical 0-V point (a zero-cross) of a voltage waveform, and accordingly an arc-discharge may terminate shortly and the contact fusion may not occur. However, in a case of the direct current electricity such as the secondary battery, a constant voltage may not cause the arc-discharge to terminate shortly, and use for a long period of time or use with a high current may cause the arc-discharge easily. The over-discharge of the secondary battery due to the contact fusion may deteriorate performance of the battery and cause a reverse reaction of the battery, thus inviting the above-mentioned serious situation.

For example, Japanese Patent Provisional Publication No. H08-182115 (hereinafter "Patent Document 1") discloses an art to detect a contact fusion of a contact and prevent a battery of an automobile from running out. The art disclosed in Patent Document 1 relates to a power supply control apparatus of an electric automobile, in which a fusion detection unit compares, when a main conductor is shut down by a control unit, a detection voltage of a voltage detector that detects a voltage across the terminals of an auxiliary battery with a comparison voltage, and judges, when the voltage exceeding the above-mentioned comparison voltage has been detected, that a fusion occurs in the main conductor, thus causing a DC-DC convertor to continue surely an operation thereof, when the fusion occurs in the main conductor. It is therefore possible to make a sure judgment of occurrence of a fusion based on continuation or discontinuation of the operation of the convertor, thus enhancing a reliability of a detection of the fusion. In addition, the DC-DC converter is caused to quit when the fusion detection unit detects the occurrence of fusion of the main conductor, thus preventing the main battery from running out even when an operator has failed to take any action to avoid the fusion.

The apparatus utilizing a secondary battery is generally provided with a circuit (a battery management system) that monitors and controls a secondary battery from the outside, or a circuit (an ECU: Electronic Control Unit) that monitors internally the apparatus itself, in order to use safely the secondary battery. In an equipment such as an electric automobile on which the secondary battery is mounted, an electricity for maintaining such a system itself is supplied from the secondary battery itself or the auxiliary battery, and the electricity for the circuit is always consumed when the apparatus is not even operated.

In an electric automobile in which a battery having a large capacity of from about 10 kWh to abut 30 kWh is mounted and an auxiliary battery such as a lead battery is mounted, it is considered that there is no possibility of over-discharge when the apparatus is not operated. However, for example in a portable power supply apparatus or an industrial equipment having a capacity of from 1 kWh to less than 10 kWh, in which a secondary battery is merely mounted, no use of it for a long period of time would lead to consumption of electricity for the system from the secondary battery, thus may cause a problem of over-discharge of the secondary battery. It is conceivable that an auxiliary battery is provided in the same manner as an electric automobile, in order to solve the above-mentioned problem. However, the auxiliary battery such as a lead battery has a short service life and a heavy weight, and is not suitable for the portable power supply apparatus or the like.

SUMMARY

In the art disclosed in Patent Document 1, all of a control of the main conductor, a detection of fusion and an output of a fusion detection signal to the inverter is conducted by the control unit. Therefore, the art may have a problem of possibility of failure of a sure detection of fusion, if the control unit is out of order. In addition, the art may have a further problem of disturbance of the signal to the control unit due to noises in various kinds of devices, even if the control unit is operating properly, thus leading to failure in a precise control.

Especially, in a control unit disclosed in Patent Document 1, which is not a control unit for an automobile, but a control unit that controls a portable power supply apparatus having an intended object to be used in a construction site in the middle of the night or in a manhole, there have been demands of conditions of simplicity of the structure of the apparatus, decrease in weight, use for a battery for a long period of time, a low cost, etc. Accordingly, it has been desirable to adopt the structure of the apparatus, which does not use expensive substrates and auxiliary systems. However, in case of such a circuit, disturbance of the signal may occur due to the noises in a manner as described above, thus leading to a shutoff or a freeze of a CPU (Central Processing Unit).

In addition, there may be a case where, if the apparatus itself is left unoperated for a long period of time as described above, a self-consumption of electricity of a monitoring control circuit specifically provided in the secondary battery may cause an over-discharge, thus leading to a hazardous situation. It is possible to stop the charging based on information, which has been acquired from the secondary battery by the control unit, in order to prevent the over-discharge by the charging unit from occurring. However, there may be a case where the signal between the secondary battery and the control unit becomes an improper information by the influence of noises, etc, thus being difficult to maintain reliability.

The present innovation provides a power supply apparatus that permits to detect surely a malfunction such as a contact fusion by a simplified structure of the apparatus, and reduce the risk of a secondary battery by an over-discharge, etc., and has a structure in which the secondary battery does not consume electricity for an internal consumption power source.

In one arrangement, a power supply apparatus utilizing a secondary battery disclosed in the present application comprises: a control unit that monitors a performance of the power supply apparatus to control it and monitors a malfunction of the power supply apparatus; a secondary battery that is connected to the control unit and discharges an electric current as charged; a main contact provided in a battery circuit network formed between the secondary battery and a load; and a auxiliary contact that is provided in the battery circuit network so as to be connected in series with the main contact, the auxiliary contact being kept in an open state under a non-operating condition of the power supply apparatus, and wherein: when a halting operation of the power supply apparatus is made, the main contact is first opened and then the auxiliary contact is opened, and when a starting operation of the power supply apparatus is made, the auxiliary contact is first closed and then the main contact is closed.

According to the power supply apparatus disclosed in the present application, the main contact and the auxiliary contact are provided in the battery circuit network for connecting the secondary battery and the load, so as to be connected in series. Accordingly, even if a malfunction such as a contact fusion, etc. occurs in the main contact, there may be provided an effect of surely preventing an over-discharge of the secondary battery by opening the auxiliary contact.

In addition, when a halting operation of the power supply apparatus is made, the main contact is first opened and then the auxiliary contact is opened, and when a starting operation of the power supply apparatus is made, the auxiliary contact is first closed and then the main contact is closed. Accordingly, there may be provided an effect of making, as long as the main contact operates properly, an operation of opening or closing the auxiliary contact in an electrically shutoff state, to prevent the contact fusion, etc. from occurring at the auxiliary contact, thus performing a higher reliable operation as a spare contact.

The power supply apparatus disclosed in the present application may further comprises: a malfunction detection circuit that measures a voltage value, a current value and/or a conduction state of the main contact and causes the auxiliary contact to be kept in an open state based on information from the measurement and an operation information on the main contact from the control unit.

According to the power supply apparatus disclosed in the present application, there may be provided an effect that the malfunction detection circuit, which is provided independently from the control unit to control the auxiliary contact in the open state based on the operation information on the main contact from the control unit and on the voltage value, the current value and/or the conduction state of the main contact, as measured by the malfunction detection circuit, measures the voltage value, the current value and/or the conduction state of the main contact and detects surely an occurrence of the malfunction such as the contact fusion, thus avoiding a risk such as remarkable increase in temperature of the battery or a gas ejection. More specifically, it is possible to cause the malfunction detection circuit to measure the voltage value, the current value and/or the conduction state of the main contact and open the auxiliary contact, thus avoiding the risk, even if a malfunction occurs in transmitting and receiving the signal due to noises. The noises as referred here may be caused by a load state of an inverter as involved, a harmonic component generated at a specific resonance point of a circuit, or a load to be connected.

In addition, there may be provided an effect that a configuration provided with such a malfunction detection circuit make it possible to detect surely a malfunction without providing expensive substrates and auxiliary systems for controlling influence of the noises, and simplify the structure of the apparatus.

The power supply apparatus disclosed in the present application may have a configuration in which the malfunction detection circuit measures in an analog value the voltage value across terminals of the battery circuit network and causes the auxiliary contact to be kept in the open state, when the voltage value is outside a predetermined range.

According to the power supply apparatus disclosed in the present application, the voltage value across terminals of the battery circuit network is measured in an analog value and the auxiliary contact is kept in the open state, when the voltage value is outside the predetermined range. Therefore, there is provided an effect that the malfunction detection circuit caused the battery circuit network to be opened, thus avoiding a risk, even in case where a malfunction occurs in transmitting and receiving the signal between the secondary battery and the control unit due to noises. Especially, it is possible to avoid a malfunction of values by the influence of the noises, etc as in a digital value, and discriminate surely the voltage value by reading in the analog value directly the voltage value across the both ends of the battery circuit network.

The power supply apparatus disclosed in the present application may have a configuration in which the malfunction detection circuit utilizes a comparator to measure in the analog value the voltage value across terminals of the battery circuit network.

According to the power supply apparatus disclosed in the present application, the malfunction detection circuit utilizes the comparator to measure in the analog value the voltage value across the terminals of the battery circuit network. Therefore, there is provided an effect that the voltage value across the terminals of the battery circuit network can be measured accurately with the simple configuration of the circuit, while suppressing the influence of the noises.

The power supply apparatus disclosed in the present application may have a configuration in which the malfunction detection circuit comprises an insulation transformer provided in a power source of the malfunction detection circuit.

According to the power supply apparatus disclosed in the present application, the malfunction detection circuit comprises the insulation transformer provided in the power source of the malfunction detection circuit. Therefore, there is provided an effect that the malfunction can be detected with a high degree of reliability, without any influence of the noises caused from the side of the inverter or the secondary battery.

The power supply apparatus disclosed in the present application may further comprise: a self-return type stop switch that halts an operation of the power supply apparatus; and a relay circuit that makes a switching operation to make an electric connection between the secondary battery and the control unit opened under a control of the control unit when the halting operation of the power supply apparatus is made, or make the electric connection closed when the starting operation of the power supply apparatus is made, and wherein: when the stop switch is switched ON, a signal from the stop switch is inputted to the control unit, the control unit causes the main contact to be opened based on the signal as inputted, the malfunction detection circuit measures the voltage value across the terminals of the battery circuit network, and when the voltage value is permissible, the control unit causes all of processings in the power supply apparatus to quit and then causes the relay circuit to be opened and causes subsequently the auxiliary contact to be opened.

According to the power supply apparatus disclosed in the present application, when the operation of the apparatus is stopped, the malfunction detection circuit checks a malfunction of the voltage value in the battery circuit network and causes all the processings to quit and then breaks the connection between the control unit and the secondary battery. Therefore, there is provided an effect of making it possible to prevent an over-charge from the secondary battery from continuing, thus leading to an over-discharge, due to the malfunction such as the contact fusion, etc. during a non-operational period of time of the power source.

The connection between the control unit and the secondary battery is broken in this manner, and there is provided an effect that no power is supplied to the control unit during the non-operational period of time of the power supply apparatus and the over-discharge can be prevented surely even when the apparatus is not used for a long period of time.

A sudden shutdown procedure to stop the apparatus may cause problems that a restarting operation may cause a freeze of a system program. However, there is provided an effect of preventing the problems such as the freeze of the program to take a smooth restarting operation, by causing, when no malfunction is found, all the processing to quit and then causing finally the relay circuit to be opened to stop the operation of the control unit.

The power supply apparatus disclosed in the present application may further comprise: a self-return type start switch that starts an operation of the power supply apparatus; and a bridge circuit that is connected to both sides of a switch in the relay circuit to make an electric connection between the control unit and the secondary battery and an electric connection between the malfunction detection circuit and the secondary battery by an closing operation of the start switch, and wherein: when the start switch is switched ON in case where the switch in the relay circuit is opened, supply of an electric power to the malfunction detection circuit from the secondary battery by the bridge circuit causes the malfunction detection circuit to be activated so that the malfunction detection circuit measures the voltage value of a first electric circuit network between the malfunction detection circuit and the secondary battery, and causes the auxiliary contact to be opened when the voltage value as measured is impermissible, or causes the auxiliary contact to be closed when the voltage value as measured is permissible, supply of the electric power to the control unit from the secondary battery by the bridge circuit causes the switch in the relay circuit to be closed under the control of the control unit so that the control unit confirms a state of the power supply apparatus, the control unit confirms, after confirmation of impermissibility of the voltage value in the first electric circuit by the malfunction detection circuit and after the state of the power supply apparatus by the control unit, impermissibility of the voltage value in a second electric circuit between the control unit, the auxiliary contact and the secondary battery, and causes the main contact to be closed to start the discharge the electric current from the secondary battery, when the voltage value is permissible.

According to the power supply apparatus disclosed in the present application, the bridge circuit is provided to be connected in parallel with the relay circuit controlled by the control unit, the bridge circuit establishes, simultaneously with the starting operation by the start switch, an electric connection between the control unit and the secondary battery and an electric connection between the malfunction detection circuit and the secondary battery, so that the malfunction detection circuit conducts a closing or opening operation of the auxiliary contact based on existence or non-existence of the malfunction of the voltage value of the first electric circuit network between the malfunction detection circuit and the secondary battery, and the control unit confirms an existence or non-existence of the malfunction of the battery, and then the control unit confirms an existence or non-existence of the malfunction of the voltage value of the second electric circuit network between the control unit, the auxiliary contact and the secondary battery. Therefore, there is provided an effect that a smooth starting operation of the respective circuits can be carried out without supplying the electricity from the secondary battery to the control unit during the non-operational period of time of the power supply apparatus, and a starting operation can be achieved with a high degree of reliability by detecting the analog voltage value of the secondary battery by the malfunction detection circuit, when starting the power supply apparatus, in order to check the malfunction.

The power supply apparatus disclosed in the present application may further comprise: a current transformer (CT) that is provided in the battery circuit network to be connected to the malfunction detection circuit or the control unit, and wherein: the control unit causes a power source of the power supply apparatus to be kept in an OFF state, in case where a power source of the power supply apparatus is kept in an ON state and an electric current has not been measured by the CT for a predetermined period of time.

According to the power supply apparatus disclosed in the present application, the power source of the power supply apparatus is kept in an ON state, in case where the power source of the power supply apparatus is kept in an ON state and then electric current has not been measured by the CT for a predetermined period of time. Therefore, there is provided an effect of preventing consumption of the battery due to failure to switch off the power source, thus avoiding a risk caused by an over-discharge.

The power supply apparatus disclosed in the present application may further comprise: a charge section that is connected to the battery circuit network and charges the secondary battery; and a charge control section that that monitors an operation of the charging unit to control same, and wherein: the control unit is connected to the charge control section through a communication circuit.

According to the power supply apparatus disclosed in the present application, the apparatus further comprise: the charge section that charges the secondary battery; and the charge control section that that monitors an operation of the charging unit to control same, and wherein: the control unit is connected to the charge control section through the communication circuit. Therefore, there is provided an effect that it is possible to monitor the state of the power supply apparatus also from the side of the charge section, and stop the charging operation from the charging section side, even in case where any problem is caused by any malfunction of the power supply apparatus during the charging operation, thus preventing an over-charge to avoid a risk.

The power supply apparatus disclosed in the present application may further comprise: a quit/restart unit that forcibly quits or restarts the control unit and/or malfunction detection circuit.

According to the power supply apparatus disclosed in the present application, the apparatus comprises the quit/restart unit that forcibly quits or restarts the control unit and/or malfunction detection circuit. Therefore, there is provided an effect that it is possible to forcibly quit the system immediately to restart it even in case of the breakdown of an arithmetic unit due to noises. The battery circuit network may be opened forcibly by detecting an over-discharge by the malfunction detection circuit, without forcibly quitting the system. However, in this case, there is a need to wait until the power supply apparatus becomes a state of over-discharge, thus being less efficient. Therefore, a reset function to restart forcibly the system is required where appropriate.

The power supply apparatus disclosed in the present application may further comprise: an alarm unit that provides an alarm information on the malfunction when the control unit and/or malfunction detection circuit detects the malfunction.

According to the power supply apparatus disclosed in the present application, the apparatus comprises the alarm unit that provides an alarm information on the malfunction when the control unit and/or malfunction detection circuit detects the malfunction. Therefore, there is provided an effect of informing a user of a malfunction, when the malfunction is detected, and take an immediate step.

DETAILED DESCRIPTION

Figure 1:
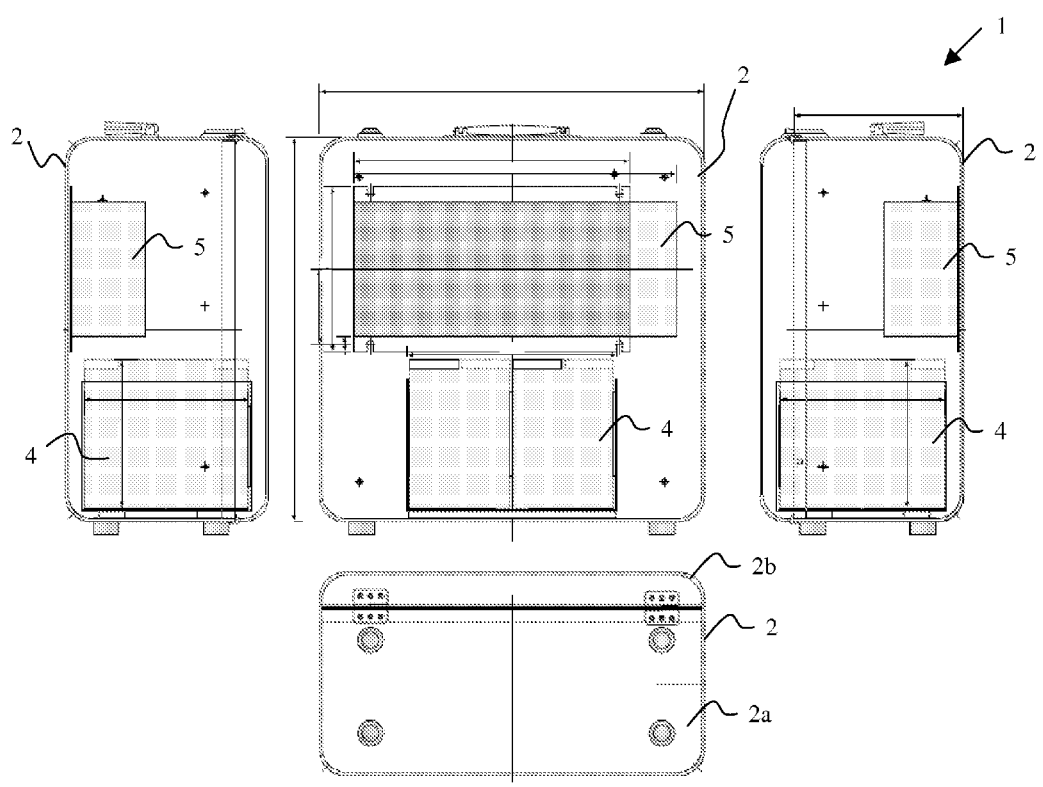
FIG. 1 is a view illustrating an internal structure of a power supply apparatus according to the first embodiment of the present innovation.

Now, embodiments according to the present innovation will be described below. The same reference numeral is assigned to the same structural component through all the embodiments.

First Embodiment

Figure 2:
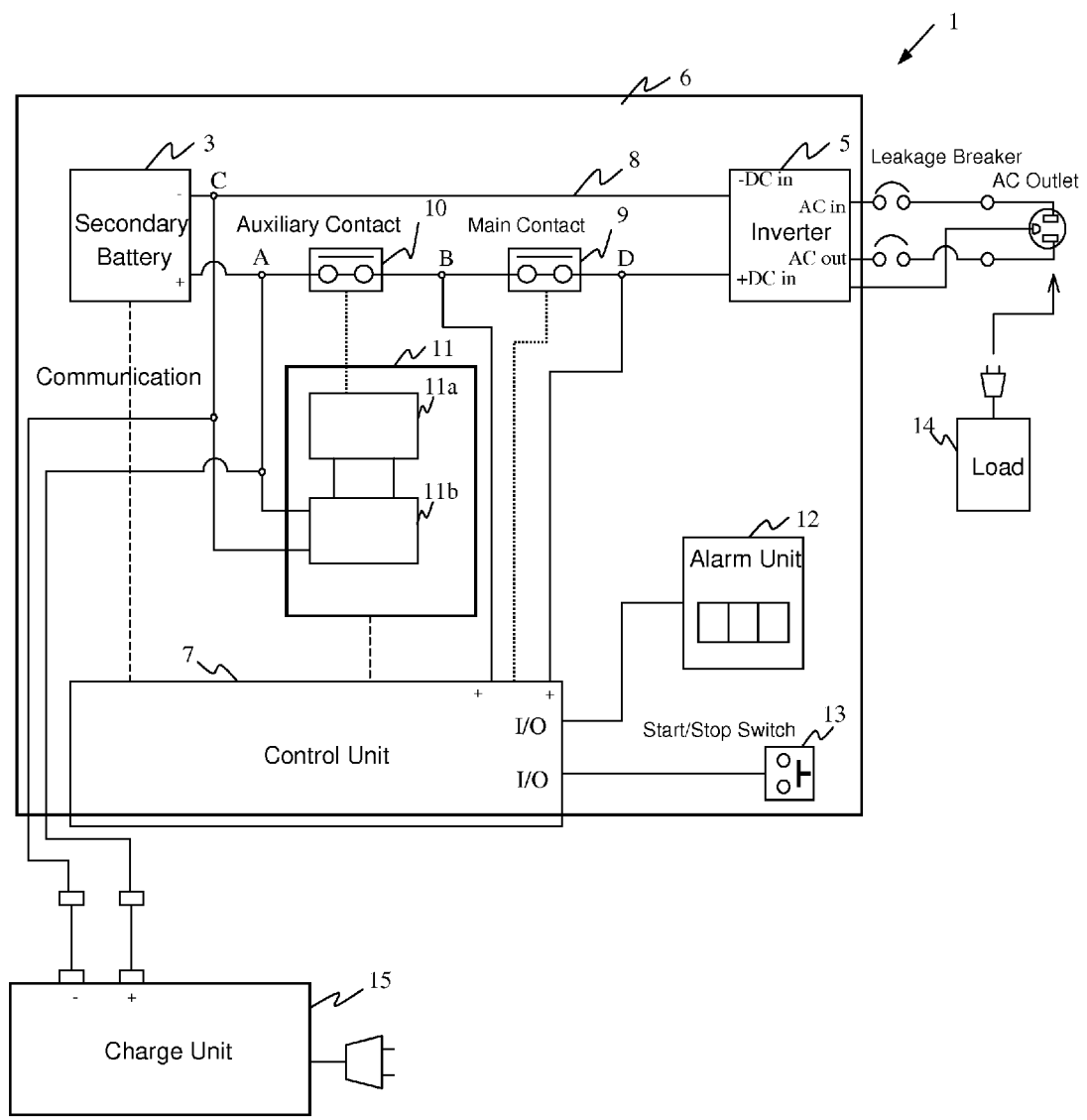
FIG. 2 is a circuit diagram of the power supply apparatus according to the first embodiment of the present innovation.

The power supply apparatus according to the present embodiment will be described with reference to FIG. 1 and FIG. 2. FIG. 1 is a view illustrating an internal structure of the power supply apparatus according to the present embodiment of the present innovation and FIG. 2 is a circuit diagram of the power supply apparatus according to the present embodiment of the present innovation.

The power supply apparatus according to the present embodiment is provided with a control unit that monitors a performance of the power supply apparatus to control it and monitors a malfunction of the power supply apparatus; a secondary battery that is connected to the control unit and discharges an electric current as charged; a main contact provided in a battery circuit network formed between the secondary battery and a load; a auxiliary contact that is connected in series with the main contact and is kept in an open state under a non-operating condition of the power supply apparatus; and a malfunction detection circuit that measures a voltage value, a current value and/or a conduction state of the main contact and causes the auxiliary contact to be kept in an open state based on information from the measurement and an operation information on the main contact from the control unit. In the power supply apparatus according to the present embodiment, when a halting operation of the power supply apparatus is made, the main contact is first opened and then the auxiliary contact is opened, and when a starting operation of the power supply apparatus is made, the auxiliary contact is first closed and then the main contact is closed.

In FIG. 1, the power supply apparatus 1 is a portable power supply apparatus, which is convenient to carry around and has an intended object to be used for example in a construction site in the middle of the night or in a manhole. A housing 2 includes a module battery 4, which is composed of a plurality of secondary batteries 3, received in a lower section of the housing, and an inverter 5 received in an upper section thereof. With respect to a type of the secondary battery, any one, which permits to charge and discharge, such as a lithium battery, a nickel hydride battery, etc. suffices. The housing 2 is composed of a main body portion 2a having an opening at a front side and a cover portion 2b for closing the opening of the main body portion 2a. The housing is provided in the opening with an operation panel (not shown) for operating the power supply apparatus 1 and an interface unit (not shown).

The power supply apparatus 1 has for example one to twenty module battery 4 with an applicable voltage of about DC 12V to about DC 350V. The state of the module battery 4 is always monitored by a control unit (see a control unit 7 in FIG. 2), and when a malfunction has occurred, a corresponding error code is outputted. An example of it is indicated in Table 1. A voltage and a temperature of the module battery 4, a voltage and a temperature of the respective cell, etc. are monitored, and a malfunction is detected.

TABLE 1

| Contents of Malfunction | Particulars | Code |
|---|---|---|
| Battery Warning | Occurrence of Battery Warning of Battery Module | E001 |
| Battery Unusable | Occurrence of Battery Unusable State Battery Module | E002 |
| Abnormal Temperature of Battery | Temperature of Battery Cell Being Threshold Value or More | E003 |
| Large Voltage Difference in Battery Cell | Difference between Maximum and Minimum of Cell Voltage in Battery Module Being Threshold Value or More | E004 |
| Reduction of Cell Voltage | Voltage of Battery Cell Being Threshold Value or Less | E005 |
| No Remaining Battery Level | Voltage of Battery Module Being Threshold Value or Less | E006 |
| Reduction of Module Voltage | Voltage of Battery Module Being Threshold Value or Less | E007 |
| Cell Voltage Swell | Voltage of Battery Cell Being Threshold Value or More | E008 |
| Overvoltage of Battery | Voltage of Battery Module Being Threshold Value × Number of Module, or More | E009 |
| Overvoltage of Module | Voltage of Battery Module Being Threshold Value or More | E010 |
| Communication Malfunction of Charging Unit | Occurrence of Communication Malfunction to Charging Unit | E011 |
| Communication Malfunction of Module | Occurring In Case Where No Response From Secondary Battery Is Made For Predetermined Time | E012 |

In the circuit network in FIG. 2, a control circuit 6 includes the control unit 7 that monitors the operation of the power supply apparatus 1 to control it and monitors a malfunction of the power supply apparatus 1; the secondary battery 3 that is connected so as to be able to make a transmitting and receiving communication of battery cell information to the control unit 7 and discharges en electric current as charged; a main contact 9 provided in the battery circuit network 8 formed between the secondary battery 3 and a load 14; a auxiliary contact 10 that is connected in series with the main contact 9 and is kept normally in a closed state; an inverter 5 that converts a direct current power discharged from the secondary battery 3 into an alternating current power; a detection unit 11 that is connected so as to be able to make a transmitting and receiving communication of information to the control unit 7 and measures a voltage value (a voltage value between A and C) a current value (a current value between B and D) and/or a conduction state (a conduction state between B and D) in the main contact, and detects a malfunction occurring in the main contact 9 and controls the auxiliary contact 10 so as to be kept in an open state, based on the values as measured and an operational information on the main contact 9 (an ON/OFF information of the main contact); an alarm unit 12 that provides an alarm information on the malfunction as detected by the control unit 7 and the detection unit 11; and a start/stop switch 13 that outputs an ON/OFF information on the power source to the control unit.

The detection unit 11 includes a malfunction detection circuit 11a, which is composed of a comparator circuit, in order to detect a voltage value of the battery circuit network 8 in an analog value; and an insulation transformer 11b, which suppresses an influence of noises caused from the inverter circuit side and the secondary battery side, as well as the secondary battery communication side, to the minimum. The malfunction detection circuit 11a controls the auxiliary contact 10 so as to be kept in an open state (an OFF state), when any malfunction has occurred in the analog voltage between A and C. Combination of the comparator and the insulation transformer makes it possible to constitute the detection unit 11, which has a resistance to the noise and reliability.

The main contact 9 and the auxiliary contact 10 are connected in series in the battery circuit network 8 so that, when a starting operation of the power supply apparatus 1 is made, the auxiliary contact 10 is first closed and then the main contact 9 is closed, and when a halting operation of the power supply apparatus 1 is made, the main contact 9 is first opened and then the auxiliary contact 10 is opened. More specifically, even if a malfunction such as a contact fusion has occurred in the main contact 9, a shutoff state of the auxiliary contact 10 permits to prevent surely the secondary battery 3 from overdischarging, and the auxiliary contact 10 is not closed or opened in a state where an electricity is supplied to the battery circuit network 8, unless a malfunction such as a contact fusion has occurred in the main contact 9. Accordingly, the malfunction such as the contact fusion does not occur in the auxiliary contact 10, and the auxiliary contact may function as a preliminary contact having a high reliability.

In FIG. 2, there are provided as external devices of the power supply apparatus 1, the load 14 to which an electricity is supplied through the battery circuit network 8, the inverter 5, an AC outlet, or the like, from the secondary battery 3; and a charging unit 15 that is connected across the both ends of the battery circuit network (between A and C) and supplies an electricity to the secondary battery 3. When charging it, carrying the power supply apparatus 1 to a place provided with the charging unit 15 and connecting the secondary battery to the same makes it possible to charge the secondary battery. After completion of the charging operation of the secondary battery 3, the power supply apparatus is disconnected from the charging unit 15. When the power supply apparatus is carried to a place where the power supply apparatus is to be used and connected to the load 14, the electric current as charged in the secondary battery 3 is discharged to the load 14.

When a connection between the secondary battery 3 and the load 14 is made in a closed state of the main contact 9 and the auxiliary contact 10, the electric current as charged in the secondary battery 3 is discharged to the load 14. The control unit 7 receives battery information of the secondary battery 3, and controls the opening and closing of the main contact 9 based on the information as received. In a normal situation, the connection of the load in a closed state of the main contact 9 causes the electric current of the secondary battery 3 to be discharged, thus gradually reducing the voltage value. The control unit 7 monitors the battery remaining level of the secondary battery 3, opens the main contact 9 prior to the over-discharge of the secondary battery 3, and stops the discharge of the electric current of the secondary battery 3.

In the normal situation, the management by the control unit 7 permits to prevent the over-discharge as described above. However, in case where the contact fusion always keeps the main contact 9 in a closed state, the management by the control unit 7 does not permit to prevent the over-discharge. More specifically, even when the control unit has opened the main contact 9 to stop the discharge of the secondary battery 3, it is not possible to open physically the main contact 9 and a continuation of the discharge leads to an over-discharge of the secondary battery 3, thus inviting an extremely dangerous situation.

In order to cope with such a situation, the malfunction detection circuit 11a measures the voltage of the battery circuit network 8 (a voltage value between A and C), and judges, in case where the voltage value of the main contact 9 is detected in spite of the main contact 9 being opened by the control unit 7, that the contact fusion has occurred in the main contact 9, and causes the malfunction detection circuit 11a to open the auxiliary contact 10. This makes it possible to surely prevent the over-discharge, even when the contact fusion has occurred in the main contact 9. There may be applied a configuration as shown in FIG. 2 (a connection between the control unit 7 and a point B, and a connection between the control unit 7 and a point D) to detect the electric current value between B and D, and a conduction state between B and D, and cause the auxiliary contact 10 is opened by the malfunction detection circuit 11a.

When the control unit 7 and the malfunction detection circuit 11a detect a malfunction, the alarm unit 12 provides information thereon, thus making it possible for a user to take a necessary step based on the information as provided.

Incidentally, it is conceivable that the control unit 7 detects the discharge of the secondary battery 3 in spite of the OFF state of the power source and causes the auxiliary contact 10 to open. However, there is a possibility that a proper communication between the secondary battery 3 and the control unit 7 may not be made due to an influence of noises, thus leading to a low degree of reliability. Therefore, it is very important to provide independently the detection unit 11. In this case, it is preferable to make the communication between the control unit 7 and the malfunction detection unit 11 in a different communication mode between the secondary battery 3 and the control unit 7.

There may be applied a configuration that there is provided a quit/restart unit (for example, a reset button) to terminate forcibly the power supply apparatus itself and then restart it, in case where the operation unit becomes non-operational or a freeze occurs due to noises. The detection unit 11 detects the over-discharge as described above, to open forcibly the battery circuit network 8. However, it is not effective since there is a need to wait until the power supply apparatus 1 is in an over-discharge state, in case where the freeze has occurred. Therefore, it is preferable to provide a reset function to restart forcibly the system, where appropriate.

In addition, the malfunction detection circuit 11a may detect not only the malfunction of the contact fusion, but also malfunctions of the secondary battery in case of occurrence for example of the over-discharge, the over-charge, the internal short-circuit due to the other reasons than the contact fusion. In case where the malfunction has occurred as described above, it may normally be solved by closing the main contact 9 by the control unit 7. However, in case where the contact fusion has occurred in the main contact 9, the noises cause an abnormal communication to be made between the secondary battery 3 and the control unit 7, or any malfunction has occurred in the control unit 7 itself, as described above, a proper control of the main contact 9 cannot be made, thus leading to impossibility of coping with various malfunctions. More specifically, it is possible to open the auxiliary contact 10 to cope with the malfunctions by measuring the voltage value between A and C by the malfunction detection unit 11 in parallel with the control unit 7 and comparing it with a reference value to detect the malfunction, in case where any malfunction has occurred in the control unit 7 itself.

Second Embodiment

Figure 3:
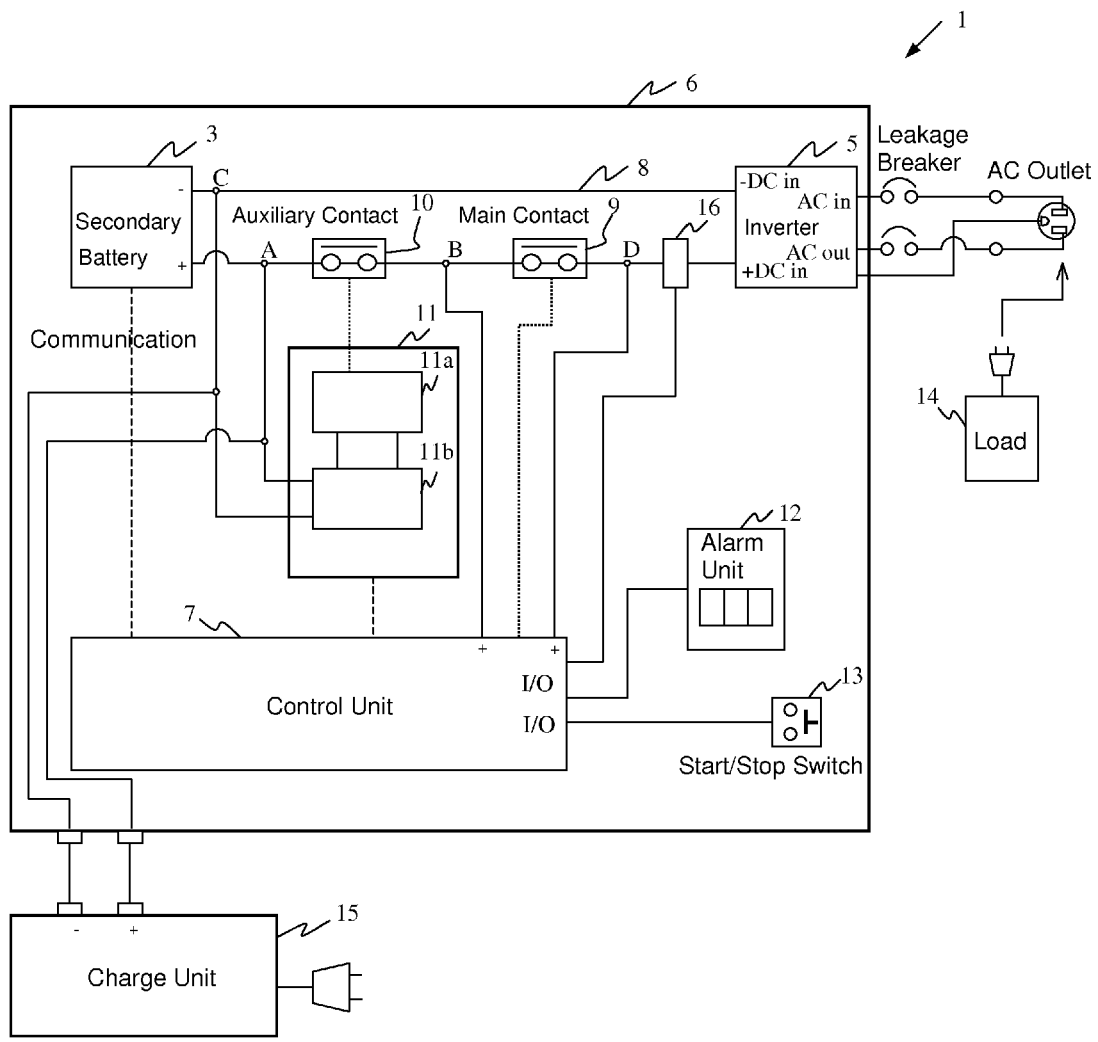
FIG. 3 is a circuit diagram of the power supply apparatus according to the second embodiment of the present innovation.

Now, the power supply apparatus according to the present embodiment will be described below with reference to FIG. 3. FIG. 3 is a circuit diagram of the power supply apparatus according to the second embodiment of the present innovation. This embodiment differs from that as shown in FIG. 2 in that a current transformer (CT) 16 is provided in the battery circuit network 8 to be connected to the control unit 7. FIG. 3 shows that the CT 16 is connected to the control unit 7. However, it may be connected to the detection unit 11.

The power supply apparatus 1 according to the present embodiment has an extended function relative to the power supply apparatus according to the above-described embodiment of the present innovation, and is provided with the CT 16, which is provided in the battery circuit network 8 to be connected to the control unit 7, and the control unit 7 causes the power source of the power supply apparatus 1 to be kept in an OFF state, in case where the power source of the power supply apparatus 1 is kept in an ON state and an electric current has not been measured by the CT 16 for a predetermined period of time.

Concerning the present embodiment, description of the same structural components as those of the aforementioned embodiment of the present innovation will be omitted.

Keeping the battery supply apparatus 1 in an ON state by a failure to switch off the main unit of the battery supply apparatus may lead to a continued discharge of the secondary battery 3, and finally to a state of over-discharge, thus being risky. In order to avoid such a risk, in the present embodiment, the control unit 7 causes the CT 16 to acquire the electric current value flowing in the battery circuit network 8, and the power source of the main unit is turned off to prevent the over-discharge, in case where the power source of the main unit is kept in an ON state and the electric current value flowing in the battery circuit network 8 is kept in a zero state for a predetermined period of time or more (for example, being settable as 1 minute, 5 minutes, 10 minutes, etc.).

There may be applied a configuration that, when the CT 16 is connected to the detection unit 11, the control unit 7 acquires information on the measurement values of the CT 16 from the detection unit 11, and the CT 16 is connected to the control unit 7, information on the measurement values is acquired directly from the CT 16.

Third Embodiment

Figure 4:
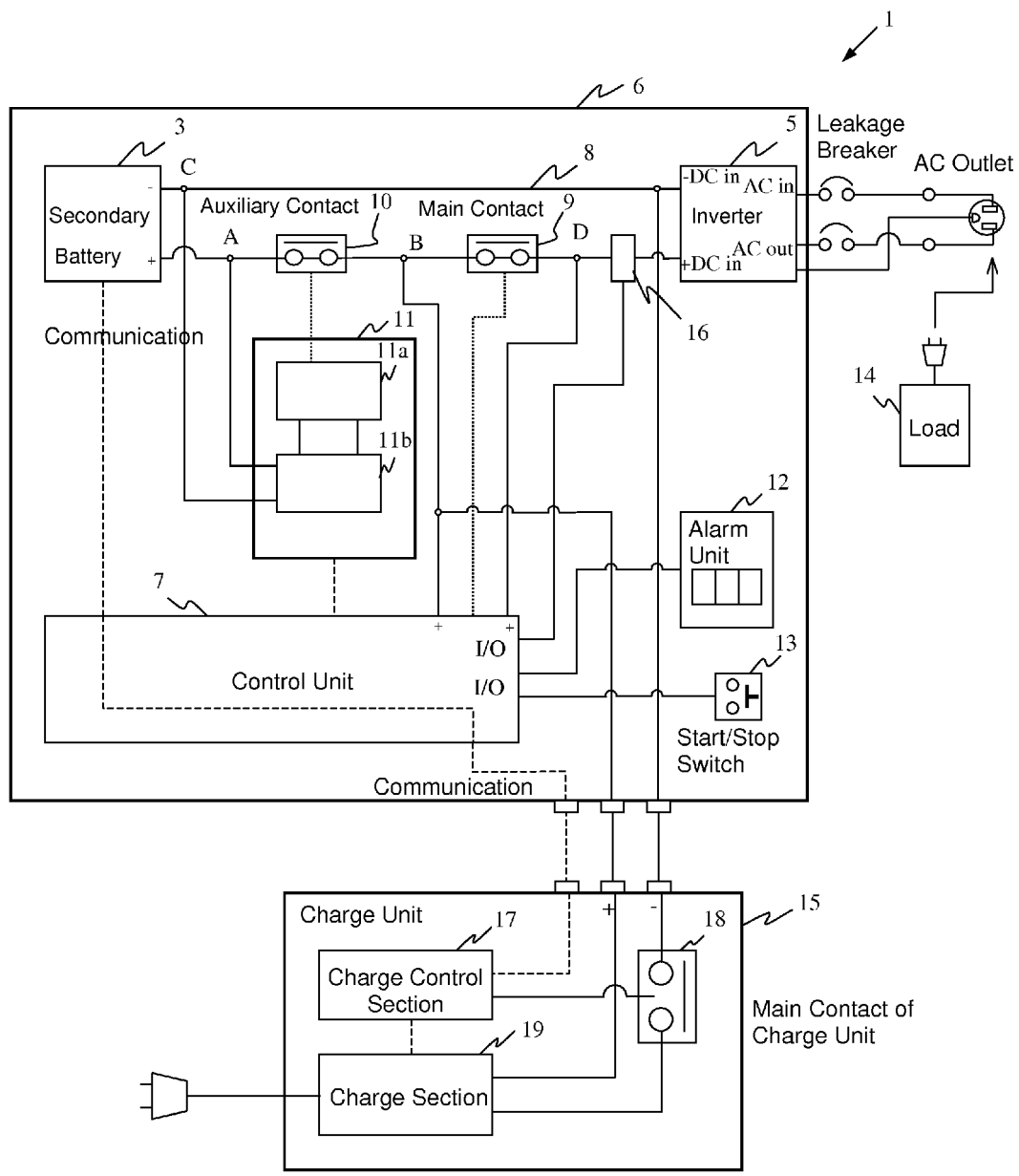
FIG. 4 is a circuit diagram of the power supply apparatus according to the third embodiment of the present innovation.

Now, the power supply apparatus according to the present embodiment will be described below with reference to FIGS. 4 and 5. FIG. 4 is a circuit diagram of the power supply apparatus according to the third embodiment of the present innovation. In the power supply apparatus according to the present embodiment, the charge unit 15 is provided with a charge control section 17, which is connected to the control unit 7 through a communication circuit.

Concerning the present embodiment, description of the same structural components as those of the aforementioned embodiment of the present innovation will be omitted.

Figure 9:
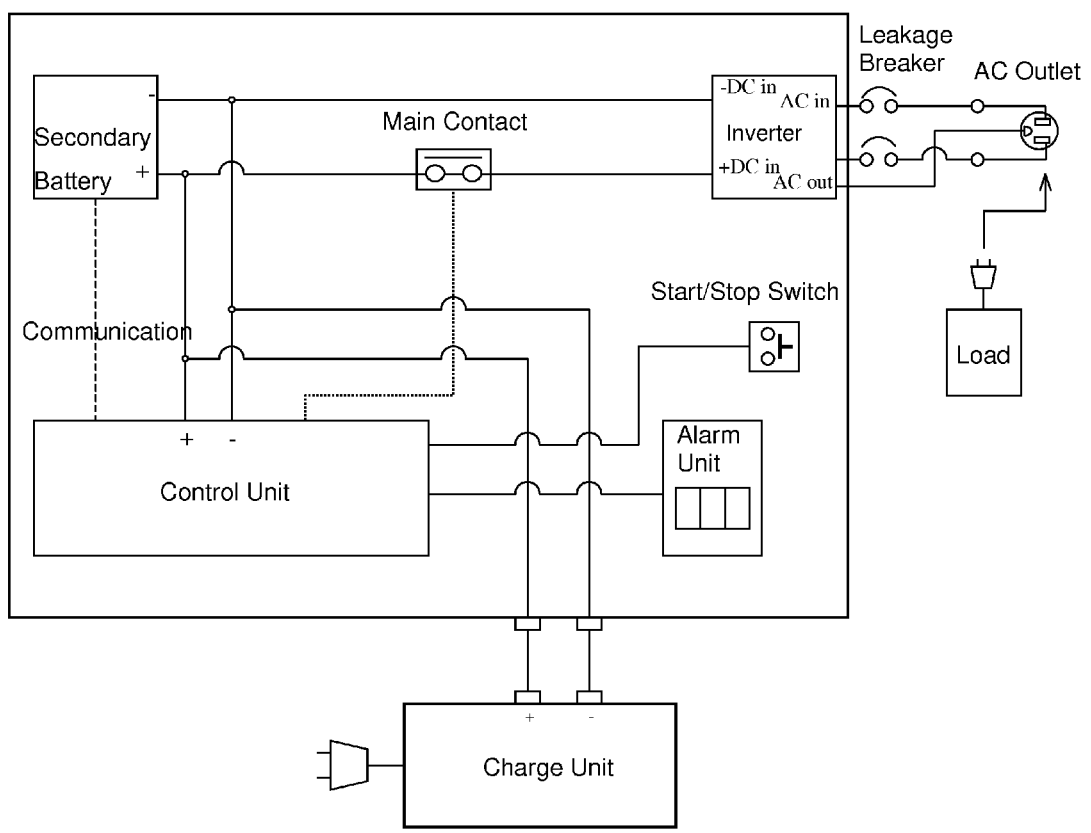
FIG. 9 is a general circuit diagram of a power supply apparatus utilizing the secondary battery.

As shown in FIG. 4, the charge unit 15 is provided with the charge control section 17 that controls the main contact 18 on the side of the charge unit 15 based on the information received from the control unit 7, and with a charge section 19 that makes an AC/DC conversion. In a normal case (for example, in a case as shown in FIG. 9), when the power supply apparatus 1 and the charge unit 15 are connected to each other, a connection to a wiring between A and C on the side of the power supply apparatus through the charge unit 19 causes the secondary battery 3 to be charged and when the charging operation has been made with a full amount of electricity, the control unit 7 sends the corresponding information to the charge unit 15 and the charging operation quits. However, when a malfunction of the communication from the control unit 7 has occurred due to influence of the noises, the charging operation does not quit, thus leading to an overcharge, as described above.

In order to avoid such a risk, in the present embodiment, when the power supply apparatus 1 and the charge unit 15 are connected to each other, the control unit 7 first sends the battery information on the secondary battery 3 to the charge control section 17. The charge control section 17 permits to calculate an amount of electricity to be charged and a period of time for charge based on the battery information as received. In case where no signal of stop of charge from the control unit 7 is received in spite of the amount of charge or the charging period of time exceeding those as calculated by the charge control section 17, an occurrence of malfunction is judged to occur on the side of the power supply apparatus 1, and the main contact 18 of the side of the charge unit is opened to stop the charging operation. Any contact fusion may not occur in the main contact 18 on the side of the charge unit, since the charging operation is gradually carried out from the OV state. Management of the battery information of the secondary battery 3 even in the charge unit 15 makes it possible to surely prevent the over-charge in this manner.

The plus and minus terminals of the charge unit 15 are connected to the wirings between B and C on the power supply apparatus, respectively. When the power supply apparatus 1 and the charge unit 15 are connected to each other, the charge control section 17 causes the malfunction detection circuit 11a to be activated through the control unit 7, so as to close the auxiliary contact 10. The closing of the auxiliary contact 10 causes an electric connection between the charge unit 15 and the secondary battery 3 so that a charging operation of the secondary battery 3 can be carried out, and a detection of a value of an analog voltage between A and C by the malfunction detection circuit 11a makes it possible to detect a malfunction of the over-charge. It is preferable to open the auxiliary contact 15 after a completion of supply of the electricity from the charge unit 15, so as to complete a proper termination of the charging operation.

In this case, the plus and minus terminals of the charge unit 15 are connected to the wirings between B and C on the power supply apparatus, respectively. However, they may be connected between A and C without passing through the auxiliary contact 10.

In FIG. 4, the power supply apparatus 1 and the charge unit 15 are shown to be independent from each other. However, the apparatus may be constituted as a system in which the charge unit 15 is integrally provided, as shown in FIG. 5.

Fourth Embodiment

Figure 6:
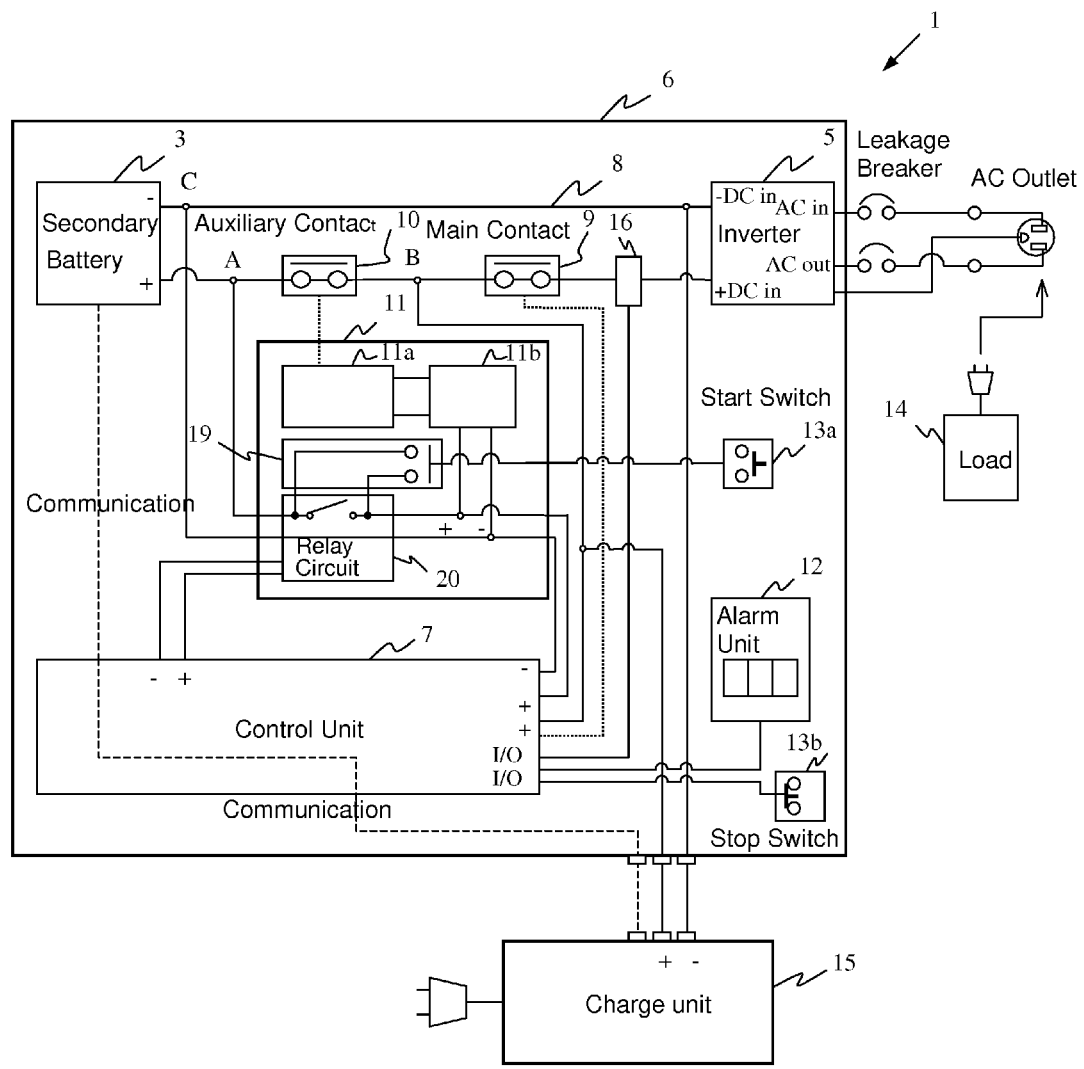
FIG. 6 is a circuit diagram of the power supply apparatus according to the fourth embodiment of the present innovation.
Figure 7:
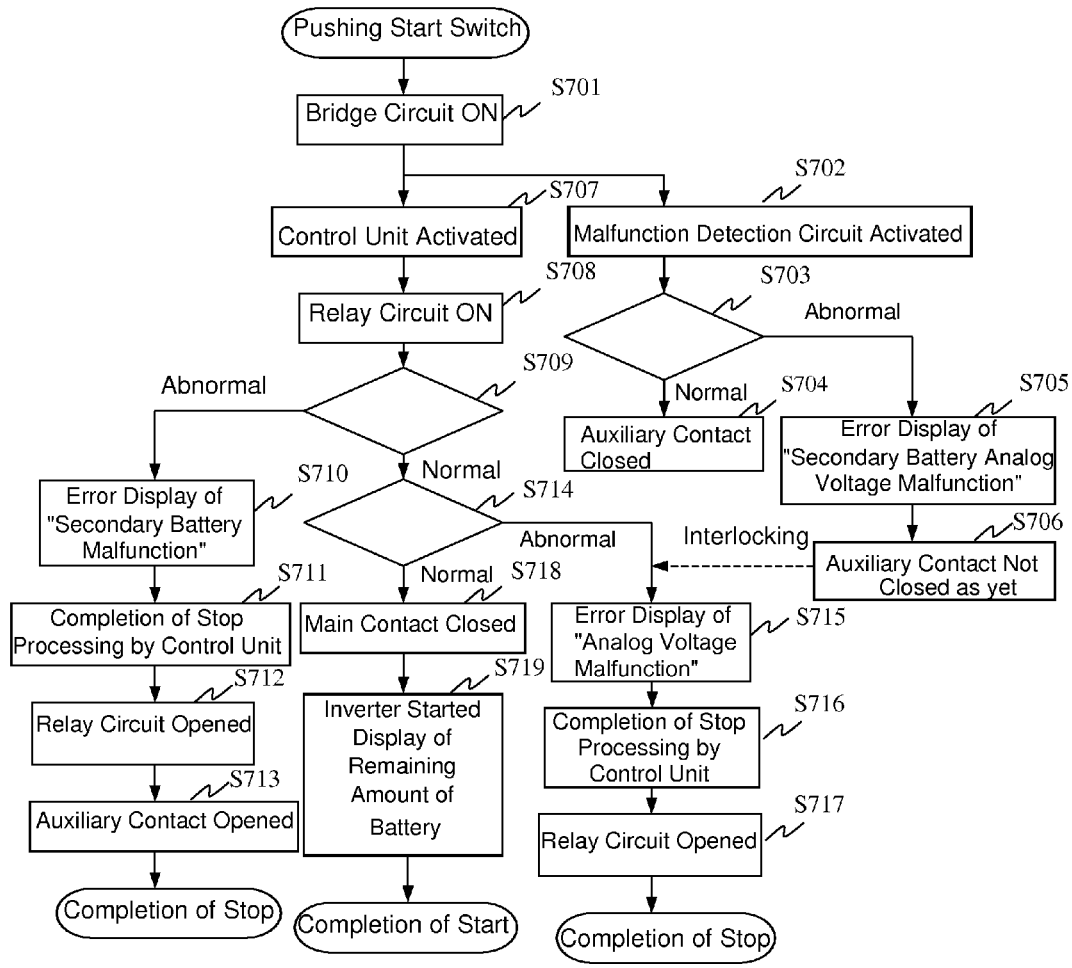
FIG. 7 is a flowchart showing a starting operation of the power supply apparatus according to the fourth embodiment of the present innovation.
Figure 8:
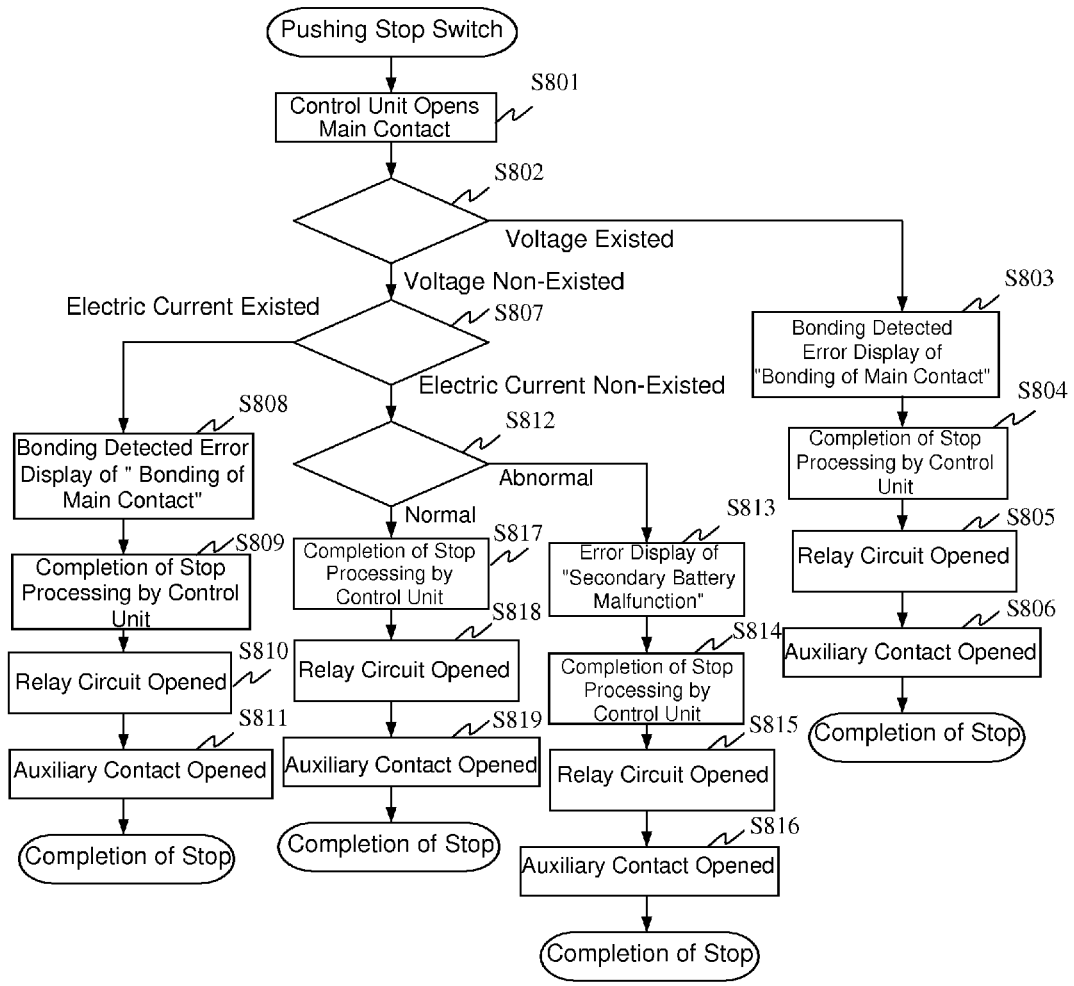
FIG. 8 is a flowchart showing a stopping operation of the power supply apparatus according to the fourth embodiment of the present innovation.

Now, the power supply apparatus according to the present embodiment will be described below with reference to FIGS. 6 to 9. FIG. 6 is a circuit diagram of the power supply apparatus according to the fourth embodiment of the present innovation, FIG. 7 is a flowchart showing a starting operation of the power supply apparatus according to the fourth embodiment of the present innovation, and FIG. 8 is a flowchart showing a stopping operation of the power supply apparatus according to the fourth embodiment of the present innovation.

Concerning the present embodiment, description of the same structural components as those of the aforementioned embodiment of the present innovation will be omitted.

The power supply apparatus according to the present embodiment is provided with a self-return type stop switch that halts an operation of the power supply apparatus; and a relay circuit that makes a switching operation to make an electric connection between the secondary battery and the control unit opened under a control of the control unit when the halting operation of the power supply apparatus is made, or make the electric connection closed when the starting operation of the power supply apparatus is made, and wherein: when the stop switch is switched ON, a signal from the stop switch is inputted to the control unit, the control unit causes the main contact to be opened based on the signal as inputted, the malfunction detection circuit measures the voltage value across the terminals of the battery circuit network, and when the voltage value is permissible, the control unit causes all of processings in the power supply apparatus to quit and then causes the relay circuit to be opened and causes subsequently the auxiliary contact to be opened.

The apparatus is further provided with a self-return type start switch that starts an operation of the power supply apparatus; and a bridge circuit that is connected to both sides of a switch in the relay circuit to make an electric connection between the control unit and the secondary battery and an electric connection between the malfunction detection circuit and the secondary battery by an closing operation of the start switch, and wherein: when the start switch is switched ON in case where the switch in the relay circuit is opened, supply of an electric power to the malfunction detection circuit from the secondary battery by the bridge circuit causes the malfunction detection circuit to be activated so that the malfunction detection circuit measures the voltage value of a first electric circuit network between the malfunction detection circuit and the secondary battery, and causes the auxiliary contact to be opened when the voltage value as measured is impermissible, or causes the auxiliary contact to be closed when the voltage value as measured is permissible, supply of the electric power to the control unit from the secondary battery by the bridge circuit causes the switch in the relay circuit to be closed under the control of the control unit so that the control unit confirms a state of the power supply apparatus, the control unit confirms, after confirmation of impermissibility of the voltage value in the first electric circuit by the malfunction detection circuit and after the state of the power supply apparatus by the control unit, impermissibility of the voltage value in a second electric circuit between the control unit, the auxiliary contact and the secondary battery, and causes the main contact to be closed to start the discharge the electric current from the secondary battery, when the voltage value is permissible.

In FIG. 6, this embodiment differs from that as described above in that the detection unit 11 is provided with the bridge circuit 19 and the relay circuit 20, and there are externally provided the self-return type start switch 13a and the self-return type stop switch 13b to switch on and off the power source of the apparatus. The control unit 7 controls a closing or opening operation of a switch of the relay circuit 20, and the closing of the switch causes the electricity to be supplied from the secondary battery 3 to the control unit 7. More specifically, the switch of the relay circuit 20 is closed under the operating condition of the power supply apparatus 1, and the switch of the relay circuit 20 is opened under the non-operating condition of the power supply apparatus 1. The bridge circuit 19 is connected across the both ends of the switch of the relay circuit 20, and the closing of the start switch 13a causes the electric connection between the control unit 7 and the secondary battery 3, as well as the electric connection between the insulation transformer 11b and the secondary battery 3. The stop switch 13b is connected to the control unit 7 and the ON/OFF information thereof is inputted to the control unit 7.

Figure 5:
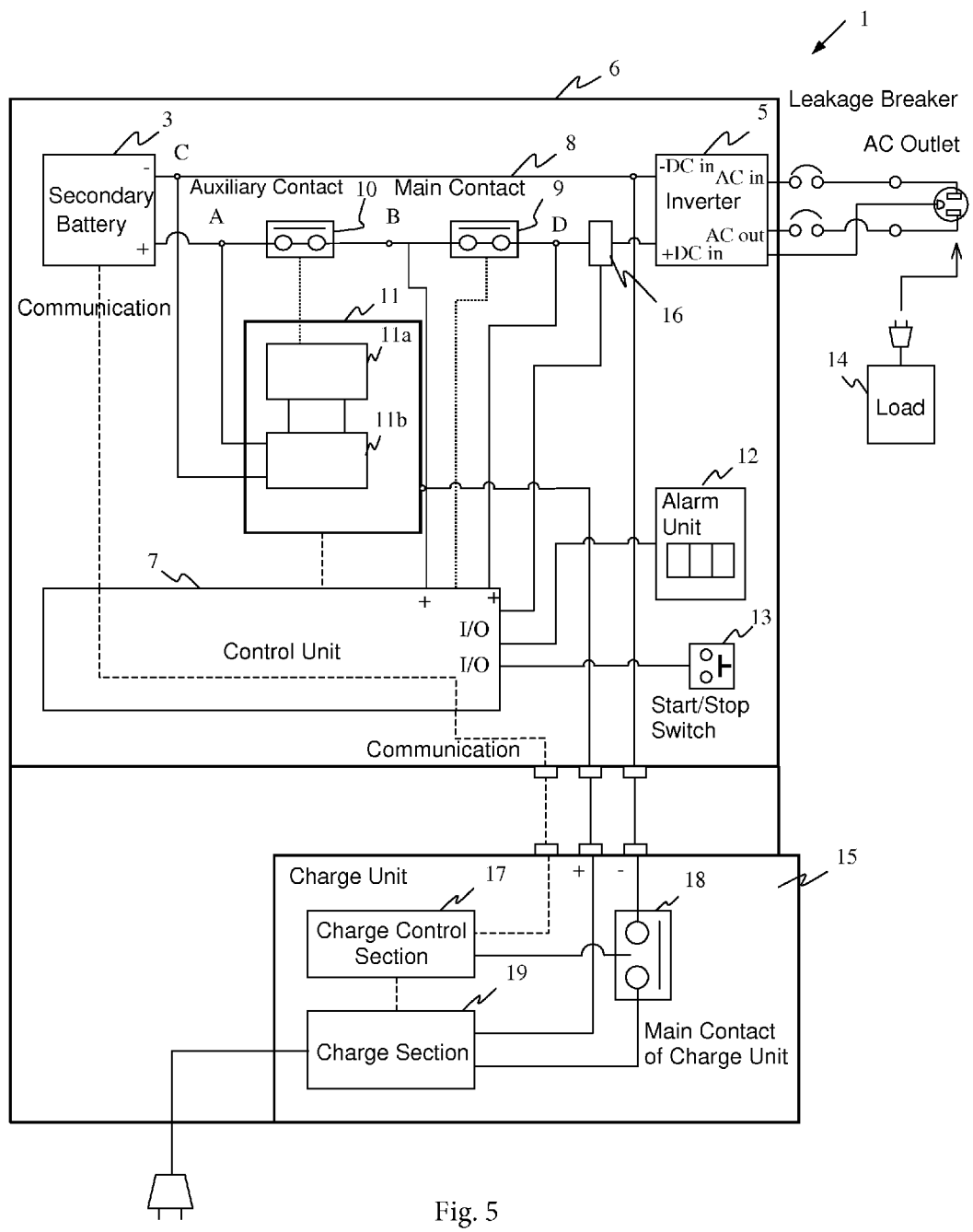
FIG. 5 is the second circuit diagram of the power supply apparatus according to the third embodiment of the present innovation.

In FIG. 6, the charge unit 15 may be provided with the charge control section so as to prevent the over-charge of the secondary battery 3, in the same manner as in FIG. 4 or 5. In addition, there may be applied a configuration that the plus and minus terminals of the charge unit 15 are connected to the wirings between B and C on the power supply apparatus, respectively, in the same manner as in FIG. 4 or 5, the charge control section causes the switch of the relay circuit 20 to be closed through the control unit 7, the malfunction detection circuit 11a receives the electricity supplied from the secondary battery 3 and is then activated, and the auxiliary contact 10 is closed, so as to start the charging operation. In this case, it is possible for the malfunction detection circuit 11a to detect the value of the analog voltage between A and C, thus permitting to detect a malfunction of the over charge.

It is preferable to open the auxiliary contact 15 after a completion of supply of the electricity from the charge unit 15, so as to complete a proper termination of the charging operation.

The terminals of the charge unit may be connected between A and C without passing through the auxiliary contact 10 so as to make the charging operation in the same manner as in FIG. 2 or 3.

Now, description will be given below of an operation of the power supply apparatus according to the present embodiment. FIG. 7 is a flowchart showing the starting operation of the power supply apparatus according to the present embodiment. Pushing the start switch 13a by a user places the bridge circuit 19 in an ON state (S701) and the electricity is supplied to the control unit 7 and the insulation transformer 11b through the bridge circuit 19 from the secondary battery 3. The supply of the electricity to the insulation transformer 11b activates the malfunction detection circuit 11a (S702), and the voltage between A and C is confirmed (S703). When the voltage between A and C is proper, the auxiliary contact 10 is closed (S704). When the voltage between A and C is not proper, the alarm unit 12 provides an alarm of "Improper Analog Voltage of Secondary Battery" (S705) and the auxiliary contact 10 is kept in the open state (S706).

In S701, when the bridge circuit 19 is turned to the ON state, the electricity is supplied to the control unit 7 from the secondary battery 3 through the bridge circuit 19, so as to activate the control unit 7 (S707). Activation of the control unit 7 causes the relay circuit 20 to be turned to the ON state under the control of the control unit 7 (S708). When the relay circuit 20 is turned to the ON state, the electricity is supplied stably to the control unit 7 from the secondary battery 3, thus permitting to cause the control unit to function. When the control unit is activated, there is obtained information on the secondary battery 3 (for example, the remaining level of the battery, a temperature, a battery voltage, etc.) and the information on the secondary battery 3 is confirmed (S709).

When the state of the secondary battery 3 is not proper, the alarm unit 12 provides an alarm of "Secondary Battery Improper" (S710), and the control unit 7 causes all of the processings to quit (S711). After the completion of the quitting operation of all the processings, the relay circuit 20 is opened (S712) and, in case where the auxiliary contact 10 has been closed, the auxiliary contact 10 is opened (S713), with the result that the power supply apparatus 1 is caused to quit as the improper state. When the state of the secondary battery 3 is proper 1 S709, the control unit 7 causes the voltage between B and C is to be detected (S714). In case where the voltage between B and C is not proper (for example, being 0V), the auxiliary contact 10 is judged to be in the opened state in Step S706) (S715), the alarm unit 12 provides the alarm of "Analog Voltage Improper" (S715), and the control unit 7 causes all of the processings to quit (S716). After the completion of the quitting operation of all the processings, the relay circuit 20 is opened (S717), with the result that the power supply apparatus 1 is caused to quit as the improper state.

If, in S714, the voltage between B and C is detected as an improper value in case of the voltage between B and C being larger than 0V, the alarm unit 12 provide an error indication corresponding to this improperness, the control unit 7 causes all the processing to quit, the relay circuit 20 is opened and the auxiliary contact 10 is opened, with the power supply apparatus 1 is caused to quit as the improper state.

When the voltage between B and C is proper in S714, the control unit 7 causes the main contact 9 to be closed (S718) and the inverter to be activated, and the alarm unit 12 provides an indication of the remaining level of battery (S719), with the result that the starting operation of the power supply apparatus is properly completed.

FIG. 8 is a flowchart showing a stopping operation of the power supply apparatus. First, when the user pushes the stop switch 13b, the control unit 7 causes the main contact 9 to be opened (S801). The malfunction detection circuit 11a makes a confirmation of the voltage between B and C(S802). In case of an existence of the voltage confirmed, the voltage has been detected in spite of the main contact 9 being opened, and accordingly the contact fusion is judged as occurring in the main contact 9 and the alarm unit 12 provides an alarm of "Main Contact Fusion" (S803). When the contact fusion is detected, the control unit 7 causes all of the processings to quit (S804), the relay circuit 20 to be opened (S805) and the auxiliary contact 10 to be opened (S806), with the power supply apparatus 1 is caused to quit as the improper state.

When a non-existence of the voltage between B and C is confirmed in S802, an electric current of the CT 16 is detected (S807). In case where the existence of the electric current of the CT 16 is confirmed, the electric current has been detected in spite of the main contact 9 being opened, and accordingly the contact fusion is judged as occurring in the main contact 9 and the alarm unit 12 provides an alarm of "Main Contact Fusion" (S803). When the contact fusion is detected, the control unit 7 causes all of the processings to quit (S809), the relay circuit 20 to be opened (S810) and the auxiliary contact 10 to be opened (S811), with the power supply apparatus 1 is caused to quit as the improper state.

The configuration and the processing of the CT 16 is not always required. However, there may be a case where, although the contact fusion has occurred in the main contact 9, the level thereof is extremely low, with the result that a sufficient amount of voltage between A and C may not be detected in spite of the contact fusion occurring. A detection of the electric current by the CT 16 makes it possible to detect surely the contact fusion and prevent the over-discharge of the secondary battery 3, thus enhancing reliability.

In case where the non-existence of the electric current of the CT 16 is confirmed in S807, the main contact 9 is judged as being opened properly, and the control unit 7 causes information on the secondary battery 3 to be obtained through a communication, and the information on the secondary battery 3 is confirmed (S812). When the state of the secondary battery 3 is not proper, the alarm unit 12 provides an alarm of "Secondary Battery Improper" (S813), and the control unit 7 causes all of the processings to quit (S814), the relay circuit 20 to be opened (S815) and the auxiliary contact 10 to be opened (S816), with the power supply apparatus 1 is caused to quit as the improper state.

When the state of the secondary battery 3 is proper in S812, the control unit 7 causes all of the processings to quit (S817), the relay circuit 20 to be opened (S818) and the auxiliary contact 10 to be opened (S819), with the power supply apparatus 1 is caused to quit as the proper state.

The above are the starting operation and the stopping operation of the power supply apparatus 1 according to the present embodiment.

There may be applied a configuration in which, in case where the power supply apparatus 1 quits as the improper state, information on the improperness is stored in a non-volatile storing unit (hereinafter referred to as the "non-volatile memory") (for example, the improper information is written in the non-volatile memory when the control unit 7 causes the process to quit). The user may restore the power supply apparatus 1 based on the information provided by the alarm unit 12, and perform the quitting process as shown in FIG. 8 as the checking operation. When the checking operation has been completed properly, the information in the non-volatile memory is rewritten appropriately upon performing the quitting process by the control unit 7 in S817.

There may be applied a configuration in which, when performing the quitting process shown in FIG. 8 as the checking operation, the checking step is added for example after activation of the control unit 7 in FIG. 7. More specifically, when the control unit 7 is activated, the information written in the non-volatile memory is read out, and the checking operation is carried out when the information as read out is improper.

After confirmation of the proper state of the system such as the properness of the secondary battery 3, the contact fusion therein, etc., when performing the starting operation, a permission of the discharge is prompted, the non-existence of the contact fusion is confirmed when performing the stopping operation, and the proper quitting state of the all the circuits are confirmed, the shutdown processing is the carried out, and after the shutdown processing of all the circuits is completed in the proper process, and then the relay circuit, which has been finally held, is opened to complete the stopping operation in the manner as described above. It is therefore possible to prevent problems such as the freeze of the system program, which is caused by a sudden shutdown procedure and then starting the system program next time, while avoiding surely the occurrence of the over-discharge due to the malfunction of the apparatus (i.e., the contact fusion of the main contact), and the consumption of the standby electricity.

In the respective embodiments as described above, there may be applied a configuration in which the secondary battery is charged by the charge unit utilizing a natural energy by a wind-powered electricity, a solar power generation, a geothermal power generation, etc.

The present innovation has been described in the form of the respective embodiments. The description of the embodiments does not limit the scope of the present innovation, and various modifications or improvements may be applied to such embodiments. The embodiments to which such modifications or improvements have been applied are encompassed by the scope of the present innovation. This is apparent from the claims and the means to solve the subject.

DESCRIPTION OF REFERENCE NUMERALS 1 power supply apparatus
2 housing
3 secondary battery
4 module battery
5 inverter
6 control circuit
7 control unit
8 battery circuit network
9 main contact
10 auxiliary contact
11 detection unit
11a malfunction detection circuit
11b insulation transformer
12 alarm unit
13 start/stop switch
14 load
15 charge unit
16 CT
17 charge control section
18 main contact of the charge unit
19 charge section

What is claimed is:

1. A power supply apparatus utilizing a secondary battery, which comprises:
a control unit that monitors a performance of said power supply apparatus to control it and monitors a malfunction of said power supply apparatus;
a secondary battery that is connected to said control unit and discharges an electric current as charged;
a main contact provided in a battery circuit network formed between said secondary battery and a load; and
an auxiliary contact that is provided in said battery circuit network so as to be connected in series with said main contact, said auxiliary contact being kept in an open state under a non-operating condition of said power supply apparatus, and
wherein:
when a halting operation of said power supply apparatus is made, said main contact is first opened and then said auxiliary contact is opened, and when a starting operation of said power supply apparatus is made, said auxiliary contact is first closed and then said main contact is closed;
further comprising:
a malfunction detection circuit that measures a voltage value, a current value and/or a conduction state of said main contact and causes said auxiliary contact to be kept in an open state based on information from the measurement and an operation information on said main contact from said control unit;
further comprising:
a self-return type stop switch that halts an operation of said power supply apparatus; and
a relay circuit that makes a switching operation to make an electric connection between said secondary battery and said control unit opened under a control of said control unit when the halting operation of said power supply apparatus is made, or make the electric connection closed when the starting operation of said power supply apparatus is made, and
wherein:
when said stop switch is switched ON, a signal from said stop switch is inputted to said control unit, said control unit causes said main contact to be opened based on the signal as inputted, said malfunction detection circuit measures the voltage value across the terminals of said battery circuit network, and when said voltage value is permissible, said control unit causes all of processings in said power supply apparatus to quit and then causes said relay circuit to be opened and causes subsequently said auxiliary contact to be opened.

2. The power supply apparatus as claimed in claim 1, wherein:
said malfunction detection circuit measures in an analog value the voltage value across terminals of said battery circuit network and causes said auxiliary contact to be kept in the open state, when said voltage value is outside a predetermined range.

3. The power supply apparatus as claimed in claim 1, wherein:
said malfunction detection circuit utilizes a comparator to measure in the analog value the voltage value across terminals of said battery circuit network.

4. The power supply apparatus as claimed in claim 1, wherein:
said malfunction detection circuit comprises an insulation transformer provided in a power source of said malfunction detection circuit.

5. The power supply apparatus as claimed in claim 1, further comprising:
a self-return type start switch that starts an operation of said power supply apparatus; and
a bridge circuit that is connected to both sides of a switch in said relay circuit to make an electric connection between said control unit and said secondary battery and an electric connection between said malfunction detection circuit and said secondary battery by an closing operation of said start switch, and
wherein:
when said start switch is switched ON in case where the switch in said relay circuit is opened,
supply of an electric power to said malfunction detection circuit from said secondary battery by said bridge circuit causes said malfunction detection circuit to be activated so that said malfunction detection circuit measures the voltage value of a first electric circuit network between said malfunction detection circuit and said secondary battery, and causes the auxiliary contact to be opened when the voltage value as measured is impermissible, or causes the auxiliary contact to be closed when the voltage value as measured is permissible,
supply of the electric power to said control unit from said secondary battery by said bridge circuit causes the switch in said relay circuit to be closed under the control of said control unit so that said control unit confirms a state of said power supply apparatus,
said control unit confirms, after confirmation of impermissibility of the voltage value in said first electric circuit by said malfunction detection circuit and after the state of said power supply apparatus by said control unit, impermissibility of the voltage value in a second electric circuit between said control unit, said auxiliary contact and said secondary battery, and causes said main contact to be closed to start the discharge the electric current from said secondary battery, when the voltage value is permissible.

6. The power supply apparatus as claimed in claim 1, further comprising:
a current transformer (CT) that is provided in said battery circuit network to be connected to said malfunction detection circuit or said control unit, and
wherein:
said control unit causes a power source of said power supply apparatus to be kept in an OFF state, in case where a power source of said power supply apparatus is kept in an ON state and an electric current has not been measured by said CT for a predetermined period of time.

7. The power supply apparatus as claimed in claim 1, further comprising:
a charge section that is connected to said battery circuit network and charges said secondary battery; and
a charge control section that monitors an operation of said charging unit to control same, and
wherein:
said control unit is connected to said charge control section through a communication circuit.

8. The power supply apparatus as claimed in claim 1, further comprising:
a quit/restart unit that forcibly quits or restarts said control unit and/or malfunction detection circuit.

9. The power supply apparatus as claimed in claim 1, further comprising:
an alarm unit that provides an alarm information on the malfunction when said control unit and/or malfunction detection circuit detects said malfunction.

\* \* \* \* \*